United States Patent
Dekker

(10) Patent No.: US 7,522,481 B2
(45) Date of Patent: Apr. 21, 2009

(54) DISC DRIVE MECHANISM AND METHOD OF OPERATION THEREFOR

(75) Inventor: Antonius Leonardus Johannes Dekker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 521 days.

(21) Appl. No.: 10/578,456

(22) PCT Filed: Oct. 28, 2004

(86) PCT No.: PCT/IB2004/052234

§ 371 (c)(1),
(2), (4) Date: May 8, 2006

(87) PCT Pub. No.: WO2005/045813

PCT Pub. Date: May 19, 2005

(65) Prior Publication Data

US 2007/0115784 A1    May 24, 2007

(30) Foreign Application Priority Data

Nov. 11, 2003   (EP) .................................. 03104148

(51) Int. Cl.
  *G11B 7/085*  (2006.01)
(52) U.S. Cl. .................. 369/30.27; 369/30.1; 369/30.3; 369/44.35
(58) Field of Classification Search ............. 369/30.27, 369/30.1–30.18, 44.27–44.29, 44.35
See application file for complete search history.

(56) References Cited

U.S. PATENT DOCUMENTS

| 4,228,326 | A | * | 10/1980 | Dakin et al. | 369/30.27 |
| 5,452,275 | A | * | 9/1995 | Ogawa | 369/44.11 |
| 5,631,890 | A | * | 5/1997 | Ikeda et al. | 369/53.35 |
| 5,768,229 | A | * | 6/1998 | Ikeda | 369/44.28 |
| 6,157,599 | A | * | 12/2000 | Yamashita et al. | 369/44.28 |
| 6,337,839 | B1 | * | 1/2002 | Nakane et al. | 369/59.25 |
| 7,366,065 | B2 | * | 4/2008 | Takeda et al. | 369/44.29 |
| 7,394,050 | B2 | * | 7/2008 | Wu et al. | 250/201.5 |

\* cited by examiner

*Primary Examiner*—Marvin M Lateef
*Assistant Examiner*—Brenda Bernardi

(57) ABSTRACT

The invention relates to disc drive mechanism (100) which comprises an actuator (113) controlling a radial movement of a lens (109). An actuator controller (115) generates an actuator control signal which is fed to the actuator (113). An activation time processor (125) determines an amplitude variation characteristic of the actuator control signal. Specifically, the activation time processor (125) determines how the amplitude varies as a function of the rotation angle. The activation time processor (125) determines an activation time for a position change actuator signal component which causes the actuator (113) to move the lens (109) to jump to a different track. The position change actuator signal component is added to the actuator control signal in the actuator controller (115) thereby generating a combined actuator control signal which both tracks the disc and effectuates a jump. The activation time is selected such that the dynamic range of the actuator control signal is reduced.

17 Claims, 4 Drawing Sheets

DISC DRIVE MECHANISM AND METHOD OF OPERATION THEREFOR

The invention relates to a disc drive mechanism and method of operation therefor and in particular to a disc drive mechanism for controlling a lens movement In recent years, there has been a general trend towards reduced size and increased mobility for much consumer equipment. For example, the use of portable phones, computers, personal music systems and personal digital Assistants (PDAs) have become increasingly widespread.

Typically, these small portable devices comprise significant amount of computational resources and are capable of processing large amounts of data Furthermore, most devices comprise means for reading data from external removable data mediums.

An example of a very high density removable data storage medium is an optical disc, and it is therefore desirable in many small devices to include a data reader for reading optical discs. In addition, optical discs are used for data distribution in many consumer equipment including for example Compact Disc players, Digital Versatile Disc players, personal computers etc.

Optical disc drives typically comprise at least one rotation motor for rotating the optical disc and an actuator for radially moving an optical reading or writing lens across the disc. Thus, the rotation motor is controlled to rotate the optical disc at a suitable rotation speed whereas the actuator is controlled in order to read or write from different areas of the disc.

The actuator must be carefully controlled in order to ensure that the reliability of the reading or writing operation is sufficiently high. Specifically, the disc drive must comprise tracking circuitry which controls the actuator to follow the radial movements of the tracks on the disc. For example, many optical discs exhibit an amount of eccentricity that causes the tracks to display a radial cyclical movement. Thus, in addition to the movement required to switch between tracks or to follow a tracks spiral movement, the lens movement must also include a tracking component that follows the variations of the tracks radial position.

The actuator for a lens of an optical drive is typically controlled by an electrical signal which is generated by control circuitry of the disc drive. Thus, the control circuitry typically generates a tracking signal component which follows the eccentricity of the disc. The tracking signal component will typically be a substantially sinusoidal signal which has a period equal to the rotation time of the signal. In addition, the control signal generates a position movement signal component which causes the actuator to move radially such as to for example switch to a different track.

Accordingly, the control circuitry must provide an output signal of sufficient dynamic range to include both the signal components associated with tracking as well as with positions changes. Specifically, the output signal must be sufficient to include both the tracking component as well as acceleration and brake impulses that may be fed to the actuator.

This, requirement for a high dynamic range requires a high supply voltage and results in reduced power efficiency and a more complex construction. For example, this may result in increased temperature due to the increased power consumption.

If the dynamic range of the output voltage is not sufficient to accommodate the worst case amplitude values of the output signal, reduced performance of the optical disc drive will typically result. For example, if the acceleration or brake pulse is restricted in the output signal of the control circuitry, the actuator may after a position change still have a residual movement component. This may cause significantly reduced performance and may lead to read or write errors.

Hence, an improved system for a disc drive mechanism and method of operation therefor could be advantageous and in particular a disc drive mechanism allowing for a decreased required dynamic range of a control voltage of an actuator, improved performance for a given dynamic range and/or reduced power consumption would be advantageous.

Accordingly, the invention preferably seeks to mitigate, alleviate or eliminate one or more of the above mentioned disadvantages singly or in any combination.

According to a first aspect of the invention, there is provided a disc drive mechanism comprising: an actuator for controlling a substantially radial movement of a lens in response to an actuator control signal; means for generating the actuator control signal; means for supplying the actuator control signal to the actuator; means for determining an amplitude variation characteristic of the actuator control signal, the amplitude variation characteristic being indicative of a variation of the actuator control signal with time;

means for determining an activation time for a position change actuator signal component in response to the amplitude variation characteristic; and means for including the position change actuator signal component in the actuator control signal in response to the activation time.

The inventors have realized that by adjusting an activation time for a position change signal component or impulse in response to an amplitude variation of the actuator control signal improved performance may be achieved. Specifically, the invention may allow for a decreased dynamic range of the actuator control signal or may alternatively or additionally allow for improved performance of the disc drive for a given dynamic range. For example, the activation time may be selected such that the combined amplitude of the actuator control signal and the position change actuator signal component does not substantially exceed the maximum amplitude available for the actuator control signal. Hence, e.g. improved performance, reduced power consumption and/or reduced complexity of the disc drive may be achieved.

The disc drive may specifically be an optical disc drive for reading from and/or writing to an optical disc. The amplitude variation characteristic may for example be determined dynamically during operation. The position change actuator signal component may be included in the actuator control signal by the position change actuator signal component being added to the otherwise generated actuator control signal. For example, the actuator control signal may be generated by adding the position change actuator signal component to a tracking component of the actuator control signal at the determined activation time.

According to a feature of the invention, the means for determining the activation time is operable to determine the activation time as a time when the actuator control signal has an absolute value below a threshold.

This allows for a simple determination of an activation time that allows a high dynamic range for the position change actuator signal component. An activation time may for example be determined which is equally suitable for position change actuator signal component of opposite polarities. This may for example allow for an acceleration and deceleration pulse to be added in a short time interval.

According to a different feature of the invention, the disc drive mechanism further comprises means for determining a zero-crossing of the actuator control signal and the means for determining the activation time is operable to determine the activation time in response to the zero crossing.

This feature may allow for a low-complexity but efficient way of determining a suitable activation time. For example, the activation time may be determined as being at or shortly before the zero crossing thus resulting in the position change actuator signal component being included at a time of low amplitude and thus high available dynamic range of the actuator control signal.

According to a different feature of the invention, the means for determining the activation time is operable to determine the activation time as a time when the actuator control signal has an amplitude of an opposite polarity with respect to a polarity of the position change actuator signal component.

This allows for higher amplitude of the position change actuator signal component. Specifically, the position change actuator signal component may be offset by a current value of the actuator control signal thereby allowing for an amplitude of the position change actuator signal component which may even exceed the maximum amplitude of the actuator control signal.

According to a different feature of the invention, the means for determining the activation time is further operable to determine the activation time as a time resulting in a time interval associated with the position change signal for which the minimum absolute amplitude of the actuator control signal within the time interval is substantially maximized.

An interval of a desired duration may be selected such that the minimum amplitude within the window is as large as possible. This may allow for the maximum offset for a position change actuator signal component of a given duration thereby allowing for the largest amplitude.

According to a different feature of the invention, the means for determining the activation time is further operable to determine the activation time as a time for which the absolute amplitude is above a threshold. This feature may allow for a low complexity determination of an activation time that will allow for a sufficient compensation for a given position change actuator signal component amplitude.

According to a different feature of the invention, the disc drive mechanism further comprises means for determining the threshold in response to a signal amplitude of the position change actuator signal component.

This may allow for a threshold to be adapted to the specific position change actuator signal component and specifically a threshold resulting in the maximum amplitude of the position change actuator signal component minus the threshold being equal to the maximum output amplitude. Thus, the threshold may be set to ensure that no clipping of the position change actuator signal component occurs.

According to a different feature of the invention, the disc drive mechanism further comprises means for dynamically determining the threshold in response to at least one measured characteristic of the actuator control signal.

This may allow for an efficient determination of a suitable threshold. For example, the actuator control signal may comprise a tracking component and the threshold may be determined in response to the amplitudes of this tracking component.

According to a different feature of the invention, the amplitude variation characteristic comprises an amplitude variation characteristic of a tracking actuator signal. This allows for an activation time for position change actuator signal component to be selected to suit a signal amplitude variation of an actuator tracking signal component of the actuator control signal.

Hence, the activation signal may be selected such that the actuator tracking signal component does not unacceptably degrade the effect of the position change actuator signal component. Specifically, the actuator tracking signal component may be used to compensate for the dynamic range variation of the position change actuator signal component.

According to a different feature of the invention, the disc drive mechanism further comprises means for determining a position change size and the means for determining the activation time is operable to determine the activation time as a time when the actuator control signal has an absolute value below a threshold if the position change size is below a threshold and to determine the activation time as a time when the actuator control signal has an amplitude of reverse polarity with respect to the polarity of the position change signals if the position change size is above the threshold.

This feature may provide for the approach for determining the activation time to be adaptable to the current conditions such that the optimal performance can be achieved. For example, the disc drive mechanism may be operable to perform small single track jumps as well as long multiple track jumps. The single track jumps may typically require short acceleration and brake pulses close together whereas the longer jumps may require longer pulses placed further apart. Thus, the single track jump may prefer a short position change interval in which the actuator control signal does not display reversing polarities of significant amplitude. Hence, the activation time is preferably when the absolute amplitude of the actuator control signal is sufficiently low. However, for large jumps the pulses may be further apart and may accordingly be situated in different time intervals of different polarity. In order to achieve the largest compensation by an actuator control signal having an opposite polarity, it is advantageous for the absolute amplitude to be relatively large. Thus, different requirements and preferences may occur for different position change sizes and the current feature allows for this to be taken into account.

According to a different feature of the invention, the means for determining the activation time is operable to determine a first interval in which the actuator control signal has a first polarity and a second interval in which the actuator control signal has a second opposite polarity and to determine a first activation time for an acceleration position change actuator signal component in the first interval and a second activation time for a deceleration position change actuator signal component in the second interval.

This feature may allow for an efficient and low complexity means of determining suitable activation times for both an acceleration pulse and a brake pulse.

According to a different feature of the invention, the amplitude variation characteristic is indicative of a variation of the actuator control signal with a rotation angle of a disc.

Preferably, the position change actuator signal component is an acceleration position change actuator signal component and/or a deceleration position change actuator signal component. Preferably, the actuator control signal is an electrical voltage and/or current signal.

According to a second aspect of the invention, there is provided a method of operation for a disc drive mechanism comprising an actuator for controlling a substantially radial movement of a lens in response to an actuator control signal; the method comprising the steps of: generating the actuator control signal; supplying the actuator control signal to the actuator; determining an amplitude variation characteristic of the actuator control signal, the amplitude variation characteristic being indicative of a variation of the actuator control signal with time; determining an activation time for a position change actuator signal component in response to the amplitude variation characteristic; and including the position change actuator signal component to the actuator control signal in response to the activation time.

These and other aspects, features and advantages of the invention will be apparent from and elucidated with reference to the embodiment(s) described hereinafter.

An embodiment of the invention will be described, by way of example only, with reference to the drawings, in which FIG. 1 illustrates a disc drive mechanism in accordance with an embodiment of the invention;

The following description focuses on an embodiment of the invention applicable to an optical disc drive mechanism wherein radial movements of a lens are controlled by electrical acceleration and deceleration (brake) pulses being supplied to an actuator. However, it will be appreciated that the invention is not limited to this application but may be applied to many other types of disc drive mechanisms.

Figure 1:
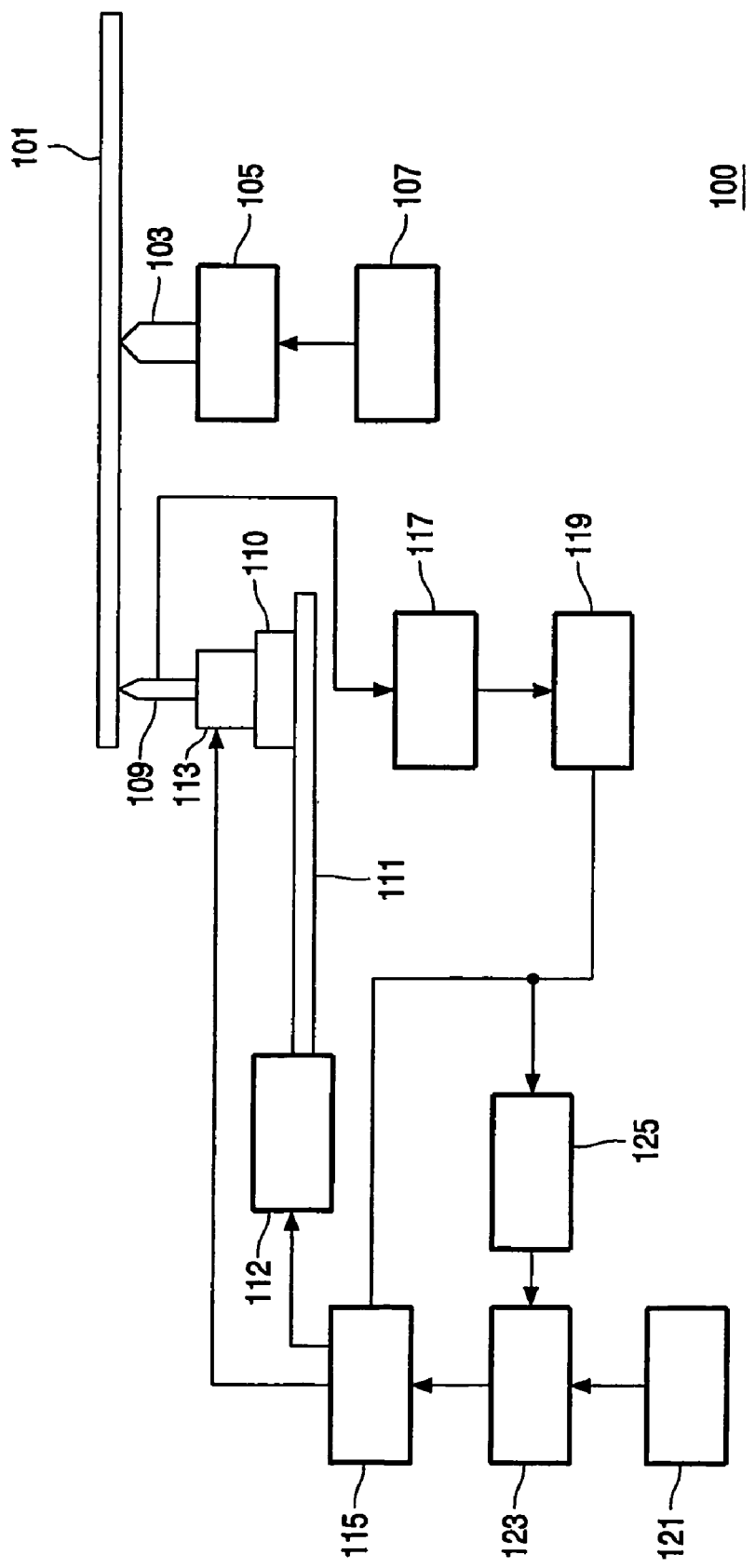

FIG. 1 illustrates an optical disc drive mechanism 100 in accordance with an embodiment of the invention.

FIG. 1 illustrates an optical disc 101 such as a Compact Disc (CD), a Digital Versatile Disc (DVD), Blu-ray disc or similar. The optical disc 101 is placed on an axle 103 and rotates when the axle 103 is rotated. The axle 103 is mounted on rotation motor 105 which is controlled by a rotation motor controller 107. The motor controller 107 provides an electrical signal to the rotation motor 105 in order to rotate the optical disc 101 at an appropriate speed during read and write operations as is well known in the art.

The disc drive mechanism 100 further comprises a lens 109 which is operable to direct a laser beam onto the optical disc 101 in order to read data from or write data to the optical disc 101. It will be appreciated that the lens 109 for clarity and simplicity is shown as a single lens element but that it may comprise any functionality required or desired for the optical reading and/or writing of data from or to the optical disc 101. As such it may comprise an number of optical elements or lens elements required for directing the laser beam to a reading or writing position of the disc and for reading data from the disc. It will be appreciated that the lens 109 furthermore comprises mechanical structures and components required or desired for assembling the different elements of the lens 109 and for mounting this.

The lens 109 is slidably mounted on a sled 110. Furthermore the sled is itself mounted on a support element 111 which extends radially across the optical disc 101. The sled 110 is slidably mounted on the support element and thus the radial movement of the lens is given by the movement of the sled 110 on the support element as well as the movement of the lens 109 on the sled 110. In the described embodiment, small and accurate movements are typically achieved by movement of the lens 109 relative to the sled 110 and larger less accurate movements are achieved by moving the sled 110 on the support element 111.

The lens 109 and sled 110 are coupled to an lens actuator 113 such that the lens actuator 113 may be activated to import a movement of the lens 109 along the longitudinal direction of the sled 110. Thus, the lens actuator 113 may control the substantially radial movement of the lens 109 across the surface of the optical disc 101. In the described embodiment, the lens actuator 113 is operable to accurately control the movement of the lens 109 but only for relatively small movements. In particular, the lens actuator 113 is in the described embodiment mounted on the sled 110. Thus, the lens actuator 113 mainly controls tracking, small jumps and adjustment movements of the lens 109.

Similarly, the sled 110 and support element 111 are coupled to a sled actuator 112 such that the sled actuator 112 may be activated to import a movement of the sled 110 along the longitudinal direction of the support element 111. Thus, the sled actuator 112 may control the substantially radial movement of the sled 110 and thus the lens 109 across the surface of the optical disc 101. In the described embodiment, the sled actuator 112 is operable control large movements of the sled 110 but only with relatively low accuracy. Thus, the sled actuator 112 mainly controls large movements of the lens 109.

Specifically, the support element 111 may comprise a spindle having a thread in which the sled 110 is engaged. The sled actuator 112 may rotate the spindle whereby a longitudinal movement along the spindle is imported to the sled 110. The lens may be moved by the lens actuator 113 that may consist of a voice coil motor. In this case the lens is moved by the electro magnetic force caused by a current in coils fixed on a lens holder that contains the lens 109 between magnets on the sled 110.

The lens 109 is coupled to a reading processor 117 which is operable to receive the signal from a reading element of the lens 109 and to generate the data read from the optical disc 101.

The lens 109 is further coupled to a tracking processor 119 which is operable to generate a tracking signal component which may be used to control the actuator 113 such that the lens 109 accurately follows the tracks on the optical disc 101.

It will be appreciated that any suitable method known in the art for generating a suitable tracking signal component may be used.

As an example, the optical disc 101 may have a degree of eccentricity which results in the tracks radial position at a given rotational angle oscillating as the optical disc 101 rotates. Typically, the variation in the radial position of a track is predominantly sinusoidal for an eccentric disc.

The tracking processor 119 is operable to detect this variation and to generate a substantially sinusoidal signal as is known in the art. Thus, the tracking processor 119 generates a tracking signal component which corresponds to the radial movements of the tracks being read (or written).

The tracking processor 119 is coupled to an actuator controller 115. The tracking signal component is fed to an actuator controller 115 which generates an actuator control signal that controls the radial movement of the lens 109 along the sled 110 as well as the radial movement of the sled 110 along the support element 111. Thus, specifically the actuator controller 115 may generate an actuator control signal comprising a signal for the actuator 113 and one for the sled actuator 112. In the described embodiment, the actuator control signal is an analogue voltage signal but in other embodiments other signal types may be used including a current signal from a suitable current generator.

Thus, in the example, the tracking processor 119 and actuator controller 115 together generate an actuator control signal which when fed to the actuator 113 generates the force required to move the lens in such a way that it tracks the radial movement of the tracks on the disc during rotation.

Figure 2:
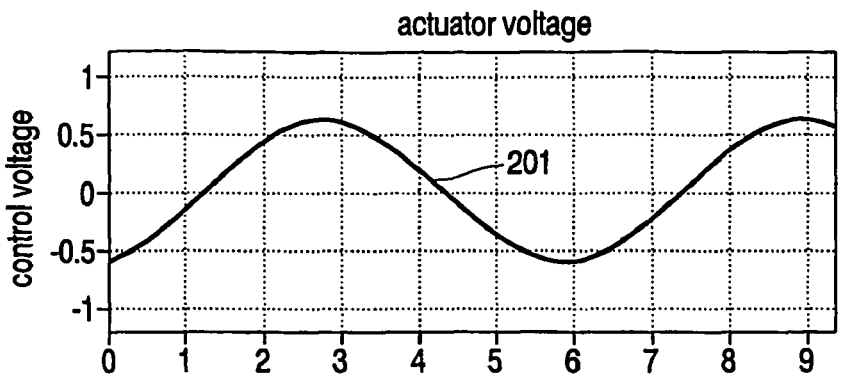
FIG. 2 illustrates an example of an actuator control signal for tracking a track on an eccentric optical disc.

FIG. 2 illustrates an example of the actuator control signal 201 generated to track a track on an eccentric optical disc. As can be seen, the actuator control signal 201 is substantially sinusoidal reflecting the sinusoidal radial movement of the track. The period of the substantially sinusoidal actuator control signal is identical to the rotation time of the optical disc.

The actuator controller 115 has a limited dynamic range for the actuator control signal. As a specific example, it will be assumed that the actuator controller 115 can generate an output signal of between −1.2 volts and +1.2 volts due to characteristics of the current supply voltage and of the construction of the output circuitry of the actuator controller 115. It will be appreciated that in other embodiments the dynamic range may be limited by other factors such as for example the input requirements of the actuator.

The disc drive 100 further comprises a position change processor 121 which determines when the lens 109 is required to move to a different part of the optical disc 101. Specifically, the position change processor 121 determines when jumps are required to different tracks. This position change may be towards or away from the center of the optical disc and may be of any size. For example, a single track jump or a multiple track jump may be instigated by the position change processor 121.

The position change processor 121 is coupled to a change signal generator 123 which generates a position change actuator signal component which when fed to the actuator 113 will cause the desired jump to be made. Specifically, the change signal generator 123 generates an acceleration pulse which will cause the actuator 113 to initiate a movement in the desired direction. The change signal generator 123 furthermore generates a deceleration or brake pulse which has the opposite polarity and which consequently causes the actuator 113 to brake. By controlling the amplitude profile and duration of the acceleration and brake pulses accurate jumps can be achieved.

The change signal generator 123 is coupled to the actuator controller 115 which generates a position change signal for the sled actuator 112 which will result in the desired change of the lens position. However, this movement may not be sufficiently accurate and therefore an accurate adjustment signal may be added to the control signal for the actuator 113. Thus, a position change actuator signal component may be combined with the tracking actuator control signal received from the tracking processor 119. Specifically, the actuator controller 115 simply adds the position change actuator signal component to the tracking actuator control signal and outputs the resulting signal to the actuator 113.

When moving the lens from one position to another, there are two possibilities. For a small movement or jump, an accurate movement may be achieved by only moving the lens 109 relative to the sled 110. Typically, this will be advantageous for jumps up to about 60 tracks. For a large movement, this is achieved by the moving the sled 110 on the support element 111. For this last kind of position change, an increased accuracy of the movement may be achieved in two ways. One is to count the tracks that passes during the movement of the sled 110 and the perform a fine (accurate) jump using the movement of the lens 109 relative to the sled 110. Another is to move the sled over the required distance (determined by the number of tracks) and subsequently carry out a fine jump only for the sake of capturing the track again. This latter may require a lens 109 correction jump, because the displacement of the sled is not accurate enough on its own.

Typically, a position change is achieved by, the actuator following a velocity profile which is at least partially controlled by a feed back control loop.

An embodiment of the invention will be described in the following with specific reference to a small movement achieved only by the moving the lens 109 relative to the sled 110.

Figure 3:
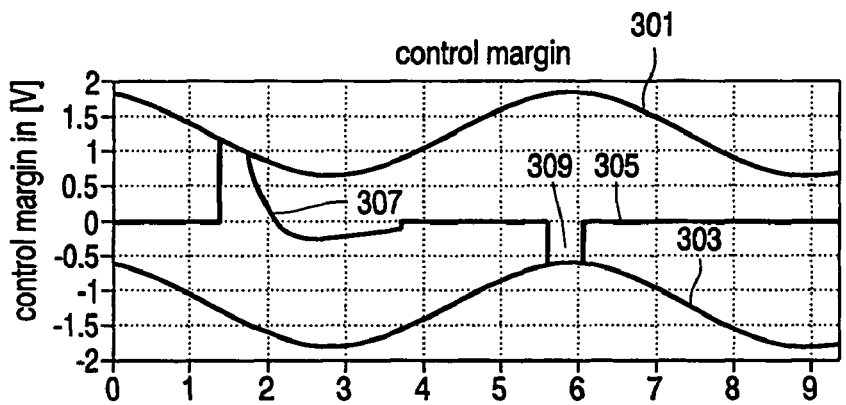
FIG. 3 illustrates an example of a position change actuator signal component for an actuator.

As the dynamic range of the actuator controller 115 is limited, the combined amplitude of the tracking actuator control signal and the position change actuator signal must not exceed the maximum positive or negative output voltage. FIG. 3 illustrates an example of a position change actuator signal component for an actuator. FIG. 3 furthermore shows the limitation on the dynamic range of the position change actuator signal imposed by the tracking actuator control signal.

Thus, curve 301 shows the positive amplitude of the position change actuator signal which will result in the combined signal exceeding the +1.2 volt maximum. Thus, at time instants 1.3 and 4.4, when the tracking actuator control signal zero, the maximum positive output voltage of the position change actuator signal is 1.2 volts. At time instant 2.8, the tracking actuator control signal has an amplitude of 0.6 volts and as shown by curve 301, the position change actuator signal therefore can have a maximum positive amplitude of only 0.6V. At time instant 5.9, the tracking actuator control signal is −0.6V and accordingly the positive amplitude of the position change actuator signal may be 1.8V. Thus, curve 301 illustrates the maximum positive amplitude of the position change actuator signal at which the combined actuator control signal is clipped by the positive edge of the dynamic range of the actuator controller 115. Similarly, curve 303 illustrates the maximum negative amplitude of the position change actuator signal at which the combined actuator control signal is ciipped by the negative edge of the dynamic range of the actuator controller 115.

Figure 4:
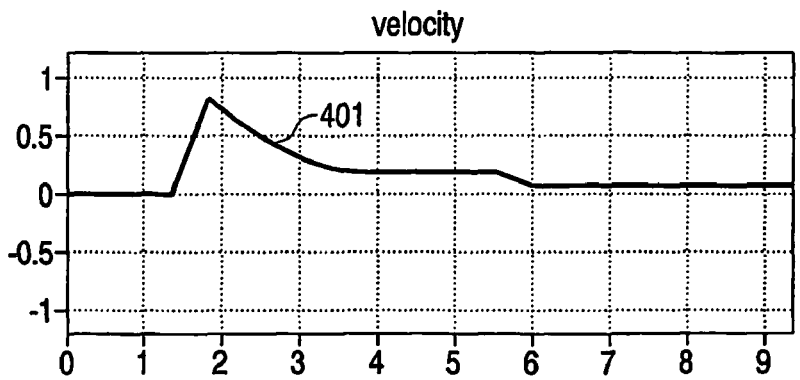
FIG. 4 illustrates an example of a velocity profile for a lens.

Curve 305 of FIG. 3 illustrates an example position change actuator signal generated by the change signal generator 123 for the lens actuator 113. As can be seen, the position change actuator signal comprises an acceleration pulse 307 which causes the actuator 113 to move the lens 109 in a desired direction and a deceleration (brake) pulse 309 which opposes the movement in this direction. FIG. 4 illustrates an example of a velocity profile 401 by a lens 109 corresponding to the position change actuator signal of FIG. 3.

As illustrated in FIG. 3, the position change actuator signal is limited by the dynamic range of the actuator controller 115 and in the example both the acceleration and the brake pulse are clipped. The clipping of the position change actuator signal will affect the movement of the lens and may result in significantly reduced performance. In the specific example, the brake pulse is clipped such that there remains a residual movement of the lens 109 at the end of the brake pulse. Thus, the track jump terminates with a residual movement of the lens 109 which results in it moving away from the desired track. This movement may possibly be detected and corrected by the tracking mechanism but this is likely to lead to reduced performance as the tracking mechanism is required to compensate for a one off error rather than a continuous characteristic.

The inventor of the current invention has realized that improved performance can be achieved by carefully controlling an activation time for the position change actuator signal. Thus, in the preferred embodiment, the disc drive 100 furthermore comprises an activation time processor 125 which determines a suitable activation time for the position change actuator signal. Specifically, the activation time processor 125 may determine preferred times for the acceleration and brake pulses of the position change actuator signal.

In the preferred embodiment, the activation time processor 125 determines an amplitude variation characteristic of the actuator control signal. Specifically, the activation time processor 125 determines times when the actuator control signal from the tracking processor 119 has a negative polarity and when it has a positive polarity. As the tracking signal typically is predominantly sinusoidal corresponding to the eccentricity of the disc, the amplitude variation as a function of time corresponds to an amplitude variation as a function of the rotational angel of the optical disc.

The activation time processor 125 then determines a suitable activation time for the position change actuator signal such that the combined actuator control signal comprising both the tracking actuator control signal and the position change actuator signal is not clipped or such that the clipping is reduced. The activation time processor 125 is coupled to the change signal generator 123 and feeds information of the determined activation time to the change signal generator 123 which times the acceleration and/or brake pulses to occur at the activation time (or the activation times).

It will be appreciated that any suitable means of determining an activation time in response to the amplitude variation characteristic or of including the position change actuator signal in the actuator control signal in response to the activation time may be used. In the following, some specific examples of suitable determinations of activation times for different applications will be described.

Figure 5:
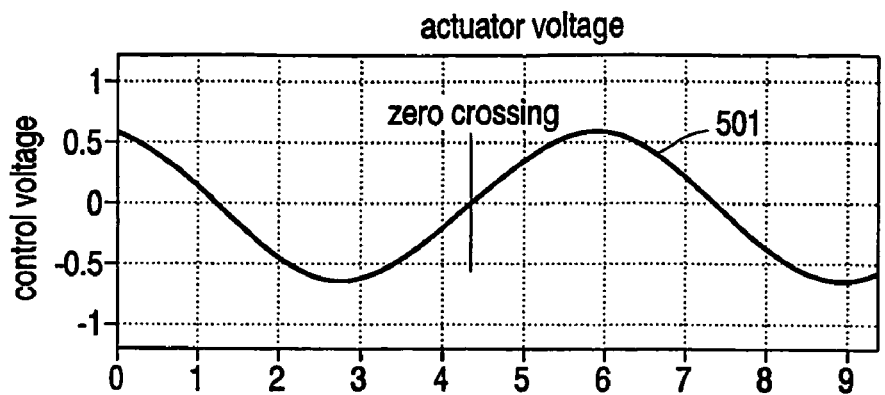
FIG. 5 illustrates an example of an actuator control signal fed to a actuator.

FIG. 5 illustrates an example of an actuator control signal 501 which is to be fed to the actuator 113 in order to track the eccentricity of the optical disc 101. If no position changes of the lens 109 are required, this signal is fed to the actuator causing the lens 109 to follow the radial movement of the current track. An example implementation will be described with reference to this actuator control signal 501.

Figure 6:
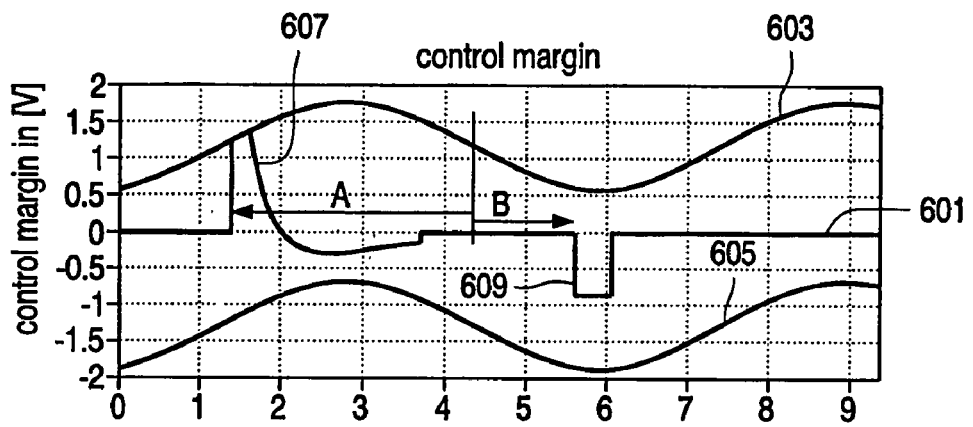
FIG. 6 illustrates a position change actuator signal in accordance with an embodiment of the invention.

FIG. 6 illustrates a position change actuator signal 601 in accordance with an embodiment of the invention. FIG. 6 further illustrates the clipping levels 603, 605 of the position change actuator signal imposed by the tracking actuator control signal 501 (similarly to FIG. 3).

In accordance with the embodiment, the activation time processor 125 determines suitable activation times for an acceleration pulse 607 and a brake pulse 609 of the position change actuator signal 601. The activation time processor 125 in this embodiment determines that the acceleration pulse 607 has a positive amplitude in order to move the lens 109 in the desired direction. Consequently, the brake pulse 609 has a negative amplitude in order to oppose this movement.

The activation time processor 125 then proceeds to evaluate the tracking actuator control signal 501 and determines in which intervals the tracking actuator control signal has a positive and negative polarity. For example, it may determine that the actuator control signal 501 is negative from time instant 1.2 to time instant 4.4 and positive from time instant 4.4 to time instant 7.6. Accordingly, the activation time processor 125 proceeds to determine an activation time for each pulse in the interval in which the polarity of the actuator control signal is the opposite of the position change actuator signal. In the specific example, an activation time of 1.5 has been determined for the acceleration pulse and an activation time of 5.7 has been determined for the brake pulse 609.

Thus, the activation time processor 125 will in this embodiment determine the activation time within an interval wherein the polarity of the actuator control signal and the position change actuator signal component are opposite. Accordingly, the actuator control signal will not limit the dynamic range of the position change actuator signal and in fact may increase the dynamic range beyond that of the output dynamic range of the actuator controller 115 as the actuator control signal may effectively offset the amplitude of the position change actuator signal.

In the specific example of FIG. 6, the acceleration pulse 607 may still be clipped but the clipping will be reduced with respect to the example of FIG. 3. Furthermore, as illustrated, the brake pulse 609 is not clipped in this case.

Figure 7:
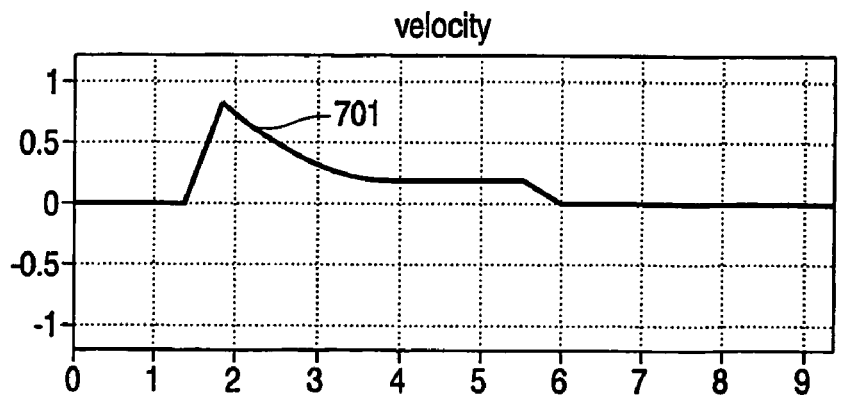
FIG. 7 illustrates a velocity profile of a lens in accordance with an embodiment of the invention.

FIG. 7 illustrates a velocity profile 701 of a lens 109 caused by the position change actuator signal 601 of FIG. 6. As can be seen, the determination of the activation time allows for the jump to be terminated with no residual movement of the lens 109 thus allowing for an improved performance of the disc drive 100 as a whole.

In other embodiments, more complex algorithms can be used to select a suitable activation time within the window of opposite polarity.

In one embodiment, the activation time is a time which results in a time interval associated with the position change signal having a minimum absolute amplitude which is as high as possible. Specifically, the change signal generator 123 may determine a duration of e.g. an acceleration pulse and feed this information to the activation time processor 125. The activation time processor 125 may then consider the tracking actuator control signal within an interval of this duration. The minimum amplitude within the interval is determined as this will correspond to the smallest offset of the position change actuator signal when these are added together, and will thus be the limiting factor for the dynamic range of the position change actuator signal. The activation time processor 125 may then move the interval and determine whether a higher minimum absolute amplitude is achieved. Hence, the interval time offset that will result in the highest minimum amplitude within the interval is selected thereby ensuring that the dynamic range for the position change actuator signal component is maximized. The activation time is then set as the time instant of the beginning of the interval.

In a simple embodiment, the activation time is simply set as the first time instant within an interval of opposite polarity in which the absolute amplitude exceeds a threshold. For example, it may be known that the dynamic range of the position change actuator signal is from −1.3V to +1.3V and that the dynamic range of the actuator controller output is from −1.2V to +1.2V. In this case, if the activation time processor 125 determines that the tracking actuator control signal varies substantially sinusoidally with a peak to peak amplitude of 1 volt, the activation time processor 125 may simply set the activation time for a positive pulse as the time when the tracking actuator control signal falls below a threshold of −0.1 volts, and set the activation time for a negative pulse as the time when the tracking actuator control signal increases above a threshold of +0.1 volts. In this way, a very simply approach is used to ensure that position change actuator signals having dynamic ranges exceeding the dynamic range of the actuator controller output are not clipped.

In some embodiments, the threshold may be determined in response to characteristics of the position change actuator signal. For example the threshold may be determined by subtracting the maximum amplitude of the position change actuator signal from the maximum output amplitude of the actuator controller output. Thus, as shown in the example above, if the maximum amplitude of the actuator controller output is +1.2 V and the maximum amplitude of the position change actuator signal is +1.3 V, the threshold is set to 1.2V−1.3V=−0.1 V. If the maximum voltage of the position change actuator signal was 1.5V, the threshold would be set to 1.2V−

1.5V=−0.3V. Hence, the threshold is in this embodiment adapted to the position change actuator signal and specifically is set to prevent or reduce clipping of the position change actuator signal.

The threshold may in some embodiments be determined in response to measured characteristics of the actuator control signal. For example, if the actuator control signal from the tracking processor 119 has a maximum amplitude of only 0.2V due to a low degree of eccentricity, the above calculation will result in a threshold that will never be exceeded and thus no activation time is determined. In this case, the threshold may instead be set to a level which results in the clipping being minimized. For example, if the duration of a position change pulse is known, the threshold may in this case be set to result in the pulse being situated when the offset from the tracking actuator control signal is as large as possible. Even if this results in clipping of the position change pulse, the clipping is reduced as much as possible.

For example, if the duration of the position change pulse is a quarter of the period of the tracking actuator control signal, the threshold may be set to −0.1 V. This will result in the position change pulse to be output during the time the tracking actuator control signal has values between −0.1 V and −0.2 V (and back to −0.1 V) and thus results in the largest offset possible for this specific tracking actuator control signal.

In some embodiments, the activation time may simply be determined as a time instant at which the absolute value of the actuator control signal falls below a threshold value. Thus in contrast to the previously described embodiment wherein the activation time was determined when the absolute value of the actuator control signal was higher than a given threshold in order to provide sufficient compensation from a signal having an opposite polarity, the current embodiment simply ensures that the amplitude of the actuator control signal is sufficiently low not to cause an unacceptable limitation of the dynamic range of the position change actuator signal. For example if the dynamic range of the position change actuator signal is ±0.8V no clipping will occur even for actuator control signal amplitudes of the same polarity up to 0.4V. Thus, by setting an activation time to the time instant when the actuator control signal falls below 0.3V, clipping of the position change actuator signal is reduced or prevented.

Figure 8:
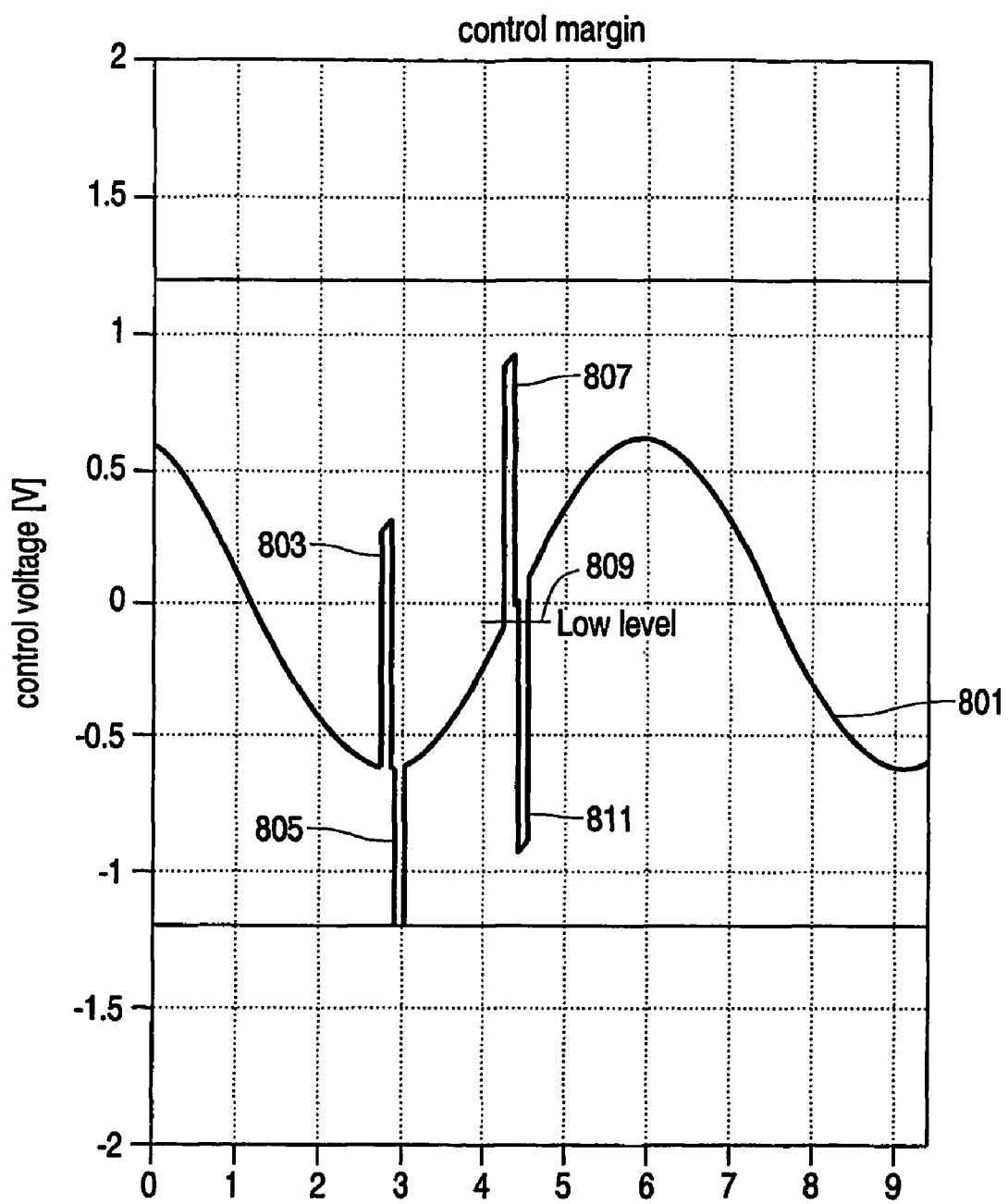
FIG. 8 illustrates an example of an actuator control signal output signal from an actuator controller.

This embodiment has the advantage that it selects an activation time which is suitable for position change actuator signals of either polarity and is thus particularly suited for applications where the position change actuator signal may comprise signal components of both polarities close to each other. FIG. 8 illustrates an example of an actuator control output signal 801 from the actuator controller 115. In the example, a single track step is executed by providing a short acceleration pulse almost immediately followed by a short brake pulse.

FIG. 8 illustrates an example wherein a first acceleration pulse 803 and a first brake pulse 805 are executed at a time when the actuator control output signal 801 has a high absolute amplitude. As can be seen, the high negative amplitude of the actuator control. output signal 801 causes the brake pulse 805 to be clipped. FIG. 8 furthermore shows the example of determining an activation time for a second acceleration pulse 807 when the absolute amplitude of the actuator control output signal 801 falls below a threshold 809. The second acceleration pulse 807 is followed by a brake pulse 811. As illustrated in FIG. 8, the low absolute amplitude of the actuator control output signal 801 achieved by the selection of the activation time allows for both the large negative and positive pulses to be accommodated without any clipping.

In other embodiments, a zero crossing of the actuator control signal is determined and the activation time is determined in response to this. For example, the activation time may be set to be close to the zero-crossing as this indicates that the amplitude of the actuator control signal is low and thus allows for large positive and negative position change actuator signal amplitudes.

In some embodiments, the activation time processor 125 may be operable to determine an activation time either as a time when the actuator control signal has an opposite polarity or as a time when the absolute amplitude is below a threshold. Furthermore, the activation time processor 125 is in this embodiment preferably capable of switching between the two algorithms depending on the size of the position change. Thus, for large position changes wherein the acceleration pulse and the brake pulse are typically separated by a significant interval, the activation time processor 125 determines the activation time to achieve a large amplitude of the opposite polarity. However, for small position changes wherein the acceleration pulse is almost immediately followed by the brake pulse, the activation time processor 125 determines the activation time as the time when the absolute value of the actuator control signal falls below a given threshold. Hence, the algorithm for determining the activation time may dynamically be selected to suit the current operation.

The invention can be implemented in any suitable form including hardware, software, firmware or any combination of these. However, preferably, the invention is implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. In addition, singular references do not exclude a plurality. Thus references to "a", "an", "first", "second" etc do not preclude a plurality.

The invention claimed is:

1. A disc drive mechanism (100) comprising:
   an actuator (113) for controlling a substantially radial movement of a lens (109) in response to an actuator control signal;
   means (115) for generating the actuator control signal;
   means (115) for supplying the actuator control signal to the actuator (113);
   means (119) for determining an amplitude variation characteristic of the actuator control signal, the amplitude variation characteristic being indicative of a variation of the actuator control signal with time;
   means (125) for determining an activation time for a position change actuator signal component in response to the amplitude variation characteristic; and means (123, 115) for including the position change actuator signal component in the actuator control signal in response to the activation time.

2. A disc drive mechanism as claimed in claim 1 wherein the means (125) for determining the activation time is operable to determine the activation time as a time when the actuator control signal has an absolute value below a threshold.

3. A disc drive mechanism as claimed in claim 1 further comprising means for determining a zero-crossing of the actuator control signal and wherein the means (125) for determining the activation time is operable to determine the activation time in response to the zero crossing.

4. A disc drive mechanism as claimed in claim 1 wherein the means (125) for determining the activation time is operable to determine the activation time as a time when the actuator control signal has an amplitude of an opposite polarity with respect to a polarity of the position change actuator signal component.

5. A disc drive mechanism as claimed in claim 4 wherein the means (125) for determining the activation time is further operable to determine the activation time as a time resulting in a time interval associated with the position change signal for which the minimum absolute amplitude of the actuator control signal within the time interval is substantially maximized.

6. A disc drive mechanism as claimed in claim 4 wherein the means (125) for determining the activation time is further operable to determine the activation time as a time for which the absolute amplitude is above a threshold.

7. A disc drive mechanism as claimed in claim 6 further comprising means for determining the threshold in response to a signal amplitude of the position change actuator signal component.

8. A disc drive mechanism as claimed in claim 6 further comprising means for dynamically determining the threshold in response to at least one measured characteristic of the actuator control signal.

9. A disc drive mechanism as claimed in claim 1 wherein the amplitude variation characteristic comprises an amplitude variation characteristic of a tracking actuator signal component of the actuator control signal.

10. A disc drive mechanism as claimed in claim 1 further comprising means for determining a position change size and wherein the means (125) for determining the activation time is operable to determine the activation time as a time when the actuator control signal has an absolute value below a threshold if the position change size is below a threshold, and to determine the activation time as a time when the actuator control signal has an amplitude of an opposite polarity with respect to a polarity of the position change signals if the position change size is above the threshold.

11. A disc drive mechanism as claimed in claim 1 wherein the means (125) for determining the activation time is operable to determine a first interval in which the actuator control signal has a first polarity and a second interval in which the actuator control signal has a second opposite polarity and to determine a first activation time for an acceleration position change actuator signal component in the first interval and a second activation time for a deceleration position change actuator signal component in the second interval.

12. A disc drive mechanism as claimed in claim 1 wherein the amplitude variation characteristic is indicative of a variation of the actuator control signal with a rotation angle of a disc.

13. A disc drive mechanism as claimed in claim 1 wherein the position change actuator signal component is an acceleration position change actuator signal component.

14. A disc drive mechanism as claimed in claim 1 wherein the position change actuator signal component is a deceleration position change actuator signal component.

15. A disc drive mechanism as claimed in claim 1 wherein the actuator control signal is a voltage signal.

16. A disc drive mechanism as claimed in claim 1 wherein the actuator control signal is a current signal.

17. A method of operation for a disc drive mechanism (100) comprising an actuator (113) for controlling a substantially radial movement of a lens (109) in response to an actuator control signal; the method comprising the steps of:
generating the actuator control signal;
supplying the actuator control signal to the actuator;
determining an amplitude variation characteristic of the actuator control signal, the amplitude variation characteristic being indicative of a variation of the actuator control signal with time;
determining an activation time for a position change actuator signal component in response to the amplitude variation characteristic; and
including the position change actuator signal component in the actuator control signal in response to the activation time.

* * * * *